United States Patent Office 3,225,016
Patented Dec. 21, 1965

3,225,016
NITROGEN-CONTAINING POLYMERS AND PREPARATION OF SAME
Herbert K. Reimschuessel, Flanders, N.J., and Alan M. Lovelace, Dayton, Ohio, assignors to the United States of America as represented by the Secretary of the Air Force
No Drawing. Filed Aug. 23, 1962, Ser. No. 219,080
7 Claims. (Cl. 260—78.4)
(Granted under Title 35, U.S. Code (1952), sec. 266)

The invention described herein may be manufactured and used by or for the United States Government for governmental purposes without payment to us of any royalty thereon.

This invention relates to novel nitrogen-containing polymeric materials and to methods of preparing the same. In a more particular aspect, this invention concerns itself with a method for synthesizing polymeric materials which have valuable properties that make them particularly useful in adhesive applications, molding, casting, laminating, as film-forming materials, filament-forming materials, as intermediates in the production of other resinous compositions and for other purposes.

The polymeric materials of this invention consist essentially of intrachain units having a triazine ring and a triazol ring in the repeating polymeric unit linked together by substituted or unsubstituted aliphatic or aromatic linkages. These polymers are obtained by effecting a condensation reaction between ingredients including (1) a triazine derivative represented by the following structural formula:

I
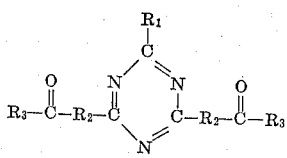

Where $R_1$ represents a member of the class consisting of monovalent lower alkyl, aryl, dialkylamine and diarylamine radicals free of aliphatic unsaturation and of no more than 8 carbon atoms in the case of the alkyl radicals and no more than 12 carbon atoms in the case of the aryl radicals; $R_2$ represents a divalent radical of the class consisting of $—C_6H_4—$, $—NHC_6H_4—$, and $—NH(CH_2)_n—$ in which $n$ represents an integer which is at least 1 and no more than 6; and $R_3$ represents a member of the class consisting of hydroxy and alkoxy radicals of no more than 5 carbon atoms; and (2) hydrazine or, alternatively, (3) a mixture of ammonia and hydrazine.

Illustrative examples of the monovalent radicals represented by $R_1$ in Formula I are: alkyl (e.g., methyl to octyl, inclusive, and the various isomeric forms thereof); aryl (e.g., phenyl, biphenylyl, naphthyl, xenyl, etc.), including aliphatic-substituted aryl (e.g., tolyl, xylyl, ethylphenyl, propylphenyl, etc.) and aryl-substituted alkyl (e.g., benzyl, phenylethyl, phenylpropyl, etc.); dialkylamine (e.g., dimethylamine, diethylamine, etc.), diarylamine (e.g., diphenylamine, etc.), including mixed aliphatic-aromatic diamines (e.g., methylphenylamine, ethylphenylamine, etc.). Illustrative examples of the radicals represented by $R_3$ in Formula I are alkoxy (e.g., methoxy, ethoxy, etc.).

It is the primary object of this invention to provide a new class of condensation polymers and a process for preparing the same.

Another object of this invention is to provide new polymeric materials which are particularly adapted for use in the formation of films and filaments, and in molding, casting, laminating and adhesive applications.

Still another object of this invention is to provide novel polymeric materials which are useful as intermediates in the preparation of other resinous materials and are of especial value as curing agents for epoxy-type resins.

The novel features which are believed to be characteristic of the invention are set forth in the appended claims. However, the invention together with further objects, advantages and features thereof will be best understood by reference to the following detailed description.

In accordance with this invention, it has been discovered that the above noted objects can be accomplished by effecting a polycondensation reaction between a triazine derivative of the kind embraced in Formula I with hydrazine or a mixture of hydrazine and ammonia. In order to bring about the polycondensation reaction, the various components are placed in an autoclave for a period of time from about 6 to 30 hours preferably at a temperature between about 200° C. to 300° C. under nitrogen. The degree of polymerization may be increased by diminishing the pressures which are applied during the latter phase of the polycondensation reaction.

With suitable conditions and starting materials, polymers may be produced which contain reactive groups that enable the polymers to undergo further reaction. For instance, a polymer synthesized by the reaction of 2-phenyl-N,N'-bis(4-carbethoxyphenyl)-4,6-diamino-s-triazine and excess hydrazine contains an exocyclic amino-group at the triazol ring and an imino-group between the triazine and the benzene nucleus. Such a polymer may be after-treated in a number of ways for the purpose of modifying its properties. For example, the melting point, the moisture regain, the solubility characteristics and thermal stability can be changed by such treatment. This after-treatment may include acidylation, reactions with isocyanates, isothiocyanates and carbonyl compounds including both aldehydes and ketones. By employing materials such as diisocyanates, polyisocyanates, dialdehydes, and dicarboxylic acids, the polymer may be rendered infusible and insoluble in all organic solvents.

The proportions of the triazine derivative and the hydrazine component may be varied from about 90 percent by weight to 95 percent by weight triazine derivative with the remainder hydrazine or, in the alternative, the remainder may be a mixture of hydrazine and ammonia in which hydrazine comprises from about 50 percent by weight to 75 percent by weight of the mixture.

The general reactions involving the preparation of the polymeric materials of this invention from the triazine derivatives of the kind embraced in Formula I may be illustrated by the following equations:

II
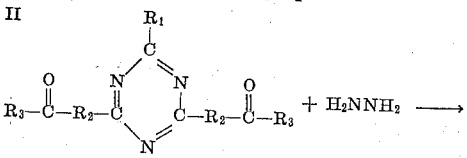

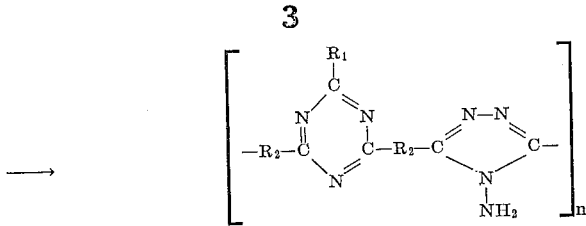

wherein n is an integer not greater than 10.

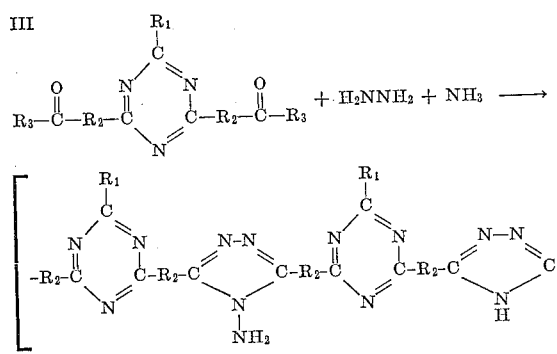

wherein n is an integer not greater than 10.

In the above equations, $R_1$, $R_2$ and $R_3$ have the same meanings as given above with reference to Formula I. The preferred polymers, from a standpoint of thermal stability and convenience of reaction, are those of the above structures were $R_1$ is a methyl or phenyl radical, $R_2$ is a —$C_6H_4$— or —$NHC_6H_4$— radical and $R_3$ is a methoxy or ethoxy radical.

In order that those skilled in the art may understand how the present invention may be carried into effect, the following examples are presented. These examples depict specific embodiments of the invention, but are not to be construed as limiting the scope of the invention in any way. All parts are by weight unless otherwise indicated.

*Example 1.—Condensation of 2-phenyl-N,N'-bis (4-carbethoxyphenyl)-4,6-diamino-s-triazine with hydrazine*

Three parts of the above triazine-bis-carbethoxy compound were put into an autoclave with 0.25 parts of hydrazine. The system was flushed with nitrogen and finally heated to 250° C., whereby the pressure increased to about 2 atm. The mixture was allowed to remain in the autoclave for 20 hours at this temperature. At the end of this time the material was heated for an additional 3 hours under nitrogen and then under diminished pressure of about 100 mm. Hg for 6 hours. The resulting light yellow polymer melted between 168–176° C. It was soluble in dimethylformamide, sulfuric acid and insoluble in 1,4 butane diol, benzene, dioxane and chloroform. The molten polymer is tough and viscous, and clear films can be pressed from the polymer in the molten stage.

*Example 2.—Condensation of 2-phenyl-N,N'-bis (4-carbethoxyphenyl)-4,6-diamino-s-triazine with hydrazine and ammonia*

Ten parts of the above triazine-bis-carbethoxy compound were introduced into a 100 cc. autoclave. To this, 0.6 parts of hydrazine and 0.3 parts of ammonia as a 30 percent solution in water were added. The autoclave was flushed with nitrogen, and finally heated to 250° C. for 20 hours. At the end of this time the polymer was removed from the autoclave and extracted on a soxhlet extractor for 5 hours with ether. The slightly yellow product, melting between 120–135° C., was obtained in 57.3 percent yield. It was soluble in dimethylformamide, dioxane and sulfuric acid.

As was stated heretofore, the products of this invention may be used, for example, as intermediates in the preparation of other resinous compositions having high thermal stability or as polymeric curing agents for epoxy-type resins. As an illustration of the utility of the polymeric materials of this invention, reference is made to Examples 3, 4 and 5 set forth hereinafter in which Examples 3 and 4 disclose a method of cross-linking the product of Example 1 with a diisocyante, and Example 5 discloses the use of the product of Example 1 as a polymeric curing agent.

*Example 3.—Crosslinking of product from Example 1 with durene diisocyanate*

One part of the polymer and 0.25 parts of durene diisocyanate were sealed in a thick walled Pyrex test tube and heated at 250° C. for 20 hours. At the end of this time the product was extracted with dimethylformamide for 5 hours in order to remove unreacted starting materials. The remaining polymer decomposed at 324° C. without melting.

*Example 4.—Crosslinking of product from Example 1 with diphenylmethane-4,4'-diisocyanate*

One part of polymer and 0.61 parts of diphenylmethane-4,4'-diisocyanate were treated as in Example 3. The insoluble reaction product decomposed at 340–360° C.

*Example 5.—Reaction of product from Example 1 with an epoxy resin from bisphenol A and epichlorohydrin*

0.81 g. of the polymer and 0.40 g. of an epoxy resin made from bisphenol A and epichlorohydrin (epoxy-equivalent 214) were sealed into a thick walled Pyrex test tube. The tube was heated as indicated above in Example 3. The brittle, clear brown polymer was ground and extracted 5 hours with dimethylformamide. The resulting product decomposed above 350° C. over a broad temperature range.

These new polymers also are particularly useful in the production of molded articles. The compositions may be employed alone or admixed with a filler dye or pigment. Among the fillers that may be employed are asbestos fibers, cotton flock, cloth cuttings, glass fibers, wood flour, mica dust, sand, clay, etc. In addition, these polymers are useful in the preparation of films and filaments, either by the conventional melt pressing and melt spinning techniques, or by equally conventional procedures well-known in the art.

It will be understood by those skilled in the art to which the present invention pertains that while the compositions and methods disclosed herein illustrate preferred embodiments of the invention, modifications and alterations can be made without departing from the spirit and scope thereof, and that all such modifications as fall within the scope of the appended claims are intended to be included herein.

What is claimed is:

1. The method of preparing nitrogen-containing synthetic resinous film and fibre forming compositions which comprises effecting a polycondensation reaction under heat at a temperature between about 200° C. to 300° C. for a period of time from about 6 to 30 hours between ingredients including (1) a triazine derivative represented by the general formula

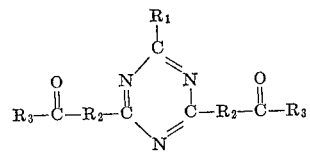

where $R_1$ represents a member selected from the group consisting of monovalent lower alkyl, aryl, dialkylamine and diarylamine radicals having from 1 to 8 carbon atoms in the case of the alkyl radicals and from 1 to 12 carbon atoms in the case of the aryl radicals; $R_2$ represents a divalent radical selected from the group consisting of —$C_6H_4$—, —$NHC_6H_4$— and —$NH(CH_2)_n$— in which n represents an integer which is from 1 to 6 and wherein the nitrogen atom is attached to the triazine nucleus; and $R_3$ represents a member selected from the group consisting of hydroxy and alkoxy radicals having from 1 to 5 carbon atoms; and (2) hydrazine.

2. The method of preparing nitrogen-containing synthetic resinous film and fibre forming compositions which comprises effecting a polycondensation reaction under heat at a temperature between about 200° C. to 300° C. for a period of time from about 6 to 30 hours between ingredients including (1) a triazine derivative represented by the general formula

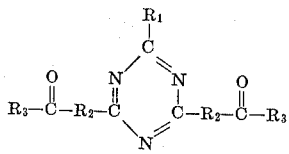

where $R_1$ represents a member selected from the group consisting of monovalent lower alkyl, aryl, dialkylamine and diarylamine radicals having from 1 to 8 carbon atoms in the case of the alkyl radicals and from 1 to 12 carbon atoms in the case of the aryl radicals; $R_2$ represents a divalent radical selected from the group consisting of —$C_6H_4$—, —$NHC_6H_4$— and —$NH(CH_2)_n$— in which $n$ represents an integer which is from 1 to 6 and wherein the nitrogen atom is attached to the triazine nucleus; and $R_3$ represents a member selected from the group consisting of hydroxy and alkoxy radicals having from 1 to 5 carbon atoms; and (2) a mixture of hydrazine and ammonia.

3. The method in accordance with claim 1 wherein $R_1$ is $C_6H_5$—, $R_2$ is —$NHC_6H_4$, and $R_3$ is $C_2H_5O$—.

4. The method in accordance with claim 2 wherein $R_1$ is $C_6H_5$—, $R_2$ is —$NHC_6H_4$, and $R_3$ is $C_2H_5O$—.

5. The method in accordance with claim 1 wherein $R_1$ is $CH_3$—, $R_2$ is —$C_6H_4$—, and $R_3$ is $CH_3O$—.

6. A film and fibre forming composition comprising the reaction product of a polycondensation reaction effected under heat at a temperature of about 250° C. for a period of time of about 29 hours between 2-phenyl-N,N'-bis (4-carbethoxyphenyl)-4,6-diamino-s-triazine and hydrazine.

7. A film and fibre forming composition comprising the reaction product of a polycondensation reaction effected under heat at a temperature of about 250° C. for a period of time of about 20 hours betweenn 2-phenyl-N,N'-bis (4-carbethoxyphenyl)-4,6-diamino-s-triazine and a mixture of hydrazine and ammonia.

References Cited by the Examiner
UNITED STATES PATENTS

| | | | |
|---|---|---|---|
| 2,512,600 | 6/1950 | Bates et al. | 260—78.4 |
| 2,884,383 | 4/1959 | Grundmann et al. | 260—2 |
| 3,155,628 | 11/1964 | Bloomfield | 260—2 |

WILLIAM H. SHORT, *Primary Examiner.*